(12) United States Patent
Kikinis

(10) Patent No.: US 7,213,256 B1
(45) Date of Patent: May 1, 2007

(54) METHOD AND APPARATUS FOR FINDING THE SAME OF SIMILAR SHOWS

(76) Inventor: Dan Kikinis, 20264 Ljepava Dr., Saratoga, CA (US) 95070

(*) Notice: Subject to any disclaimer, the term of this patent is extended or adjusted under 35 U.S.C. 154(b) by 773 days.

(21) Appl. No.: 09/752,612

(22) Filed: Dec. 29, 2000

(51) Int. Cl.
H04N 5/445 (2006.01)

(52) U.S. Cl. .................. 725/53; 725/39; 725/40; 725/45; 725/47

(58) Field of Classification Search ............ 725/37–40, 725/44–52, 53; 348/563, 564, 569
See application file for complete search history.

(56) References Cited

U.S. PATENT DOCUMENTS

| | | | |
|---|---|---|---|
| 4,621,259 A | 11/1986 | Schepers et al. | |
| 4,751,578 A | 6/1988 | Reiter et al. | |
| 4,963,994 A | 10/1990 | Levine | |
| 5,038,211 A | 8/1991 | Hallenbeck | |
| 5,243,418 A | 9/1993 | Kuno et al. | |
| 5,293,357 A | 3/1994 | Hallenbeck | |
| 5,410,344 A * | 4/1995 | Graves et al. | 725/46 |
| 5,414,773 A | 5/1995 | Handelman | |
| 5,475,835 A * | 12/1995 | Hickey | 707/104.1 |
| 5,479,268 A | 12/1995 | Young et al. | |
| 5,532,754 A | 7/1996 | Young et al. | |
| 5,550,576 A | 8/1996 | Klosterman | |
| 5,684,525 A | 11/1997 | Klosterman | |
| 5,704,837 A | 1/1998 | Iwasaki et al. | |
| 5,737,028 A | 4/1998 | Bertram et al. | |
| 5,751,282 A | 5/1998 | Girard et al. | |
| 5,808,613 A | 9/1998 | Marrin et al. | |
| 5,818,441 A | 10/1998 | Throckmorton et al. | |
| 5,822,123 A * | 10/1998 | Davis et al. | 725/43 |
| 5,828,945 A | 10/1998 | Klosterman | |
| 5,841,563 A | 11/1998 | Effenberger | |
| 5,867,226 A * | 2/1999 | Wehmeyer et al. | 725/46 |
| 5,900,915 A | 5/1999 | Morrison | |
| 5,923,362 A | 7/1999 | Klosterman | |
| 5,926,168 A | 7/1999 | Fan | |
| 5,929,849 A | 7/1999 | Kikinis | |
| 5,940,073 A | 8/1999 | Klosterman et al. | |
| 5,956,456 A | 9/1999 | Bang et al. | |
| 5,999,167 A | 12/1999 | Marsh et al. | |
| 5,999,187 A | 12/1999 | Dehmlow et al. | |
| 6,002,403 A | 12/1999 | Sugiyama et al. | |
| 6,029,195 A | 2/2000 | Herz | |

(Continued)

FOREIGN PATENT DOCUMENTS

WO   WO 00/01149 A1   1/2000

Primary Examiner—Kieu-Oanh Bui
(74) Attorney, Agent, or Firm—Todd S. Parkhurst; Holland & Knight LLP

(57) ABSTRACT

A method and apparatus providing for expanded search functionality in an electronic program guide (EPG) for television is described. The expanded search function finds show titles that are the same or similar to the show title of the program data currently displayed by the EPG. The expanded search function also finds shows similar to the one currently displayed by the EPG by using additional search elements based on the descriptive part of the EPG program data, such as actors, director, genre, etc., as well as search parameters based on the show time, channel, etc. Rather than only finding exact matches, the expanded search function uses fuzzy logic to find near matches and prioritizes the results according to the search elements and parameters as specified by the viewer.

41 Claims, 6 Drawing Sheets

U.S. PATENT DOCUMENTS

| | | |
|---|---|---|
| 6,061,055 A | 5/2000 | Marks |
| 6,072,983 A | 6/2000 | Klosterman |
| 6,075,575 A | 6/2000 | Schein et al. |
| 6,078,348 A | 6/2000 | Klosterman et al. |
| 6,081,271 A | 6/2000 | Bardon et al. |
| 6,167,188 A | 12/2000 | Young et al. |
| 6,205,485 B1 | 3/2001 | Kikinis |
| 6,216,264 B1 * | 4/2001 | Maze et al. .................. 725/53 |
| 6,233,389 B1 | 5/2001 | Barton et al. |
| 6,243,039 B1 | 6/2001 | Elliot |
| 6,271,831 B1 | 8/2001 | Escobosa et al. |
| 6,483,548 B1 * | 11/2002 | Allport ....................... 348/564 |
| 6,567,984 B1 * | 5/2003 | Allport ....................... 725/110 |
| 6,640,337 B1 * | 10/2003 | Lu ............................... 725/39 |
| 6,681,396 B1 * | 1/2004 | Bates et al. .................. 725/58 |
| 2004/0221310 A1 * | 11/2004 | Herrington et al. ........... 725/46 |

\* cited by examiner

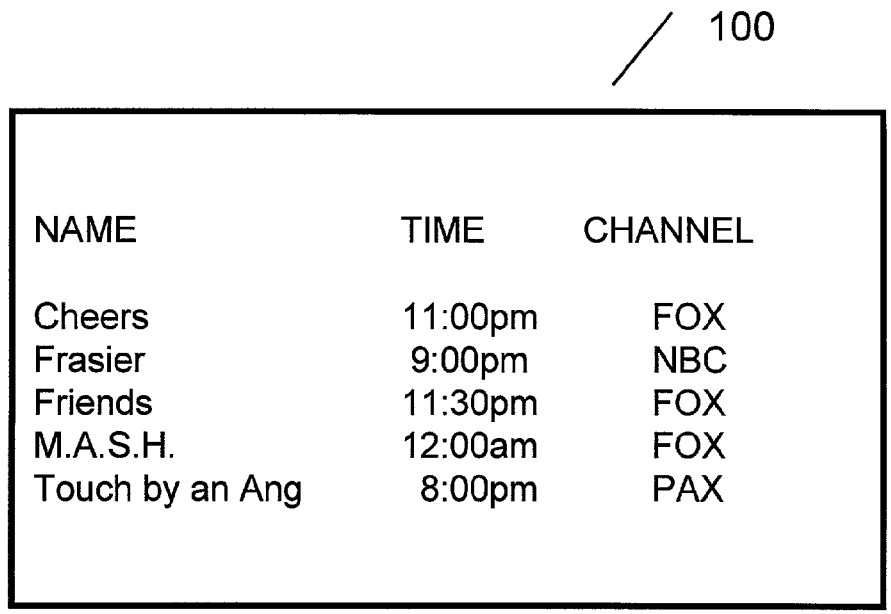
Fig. 1a - (Prior Art)
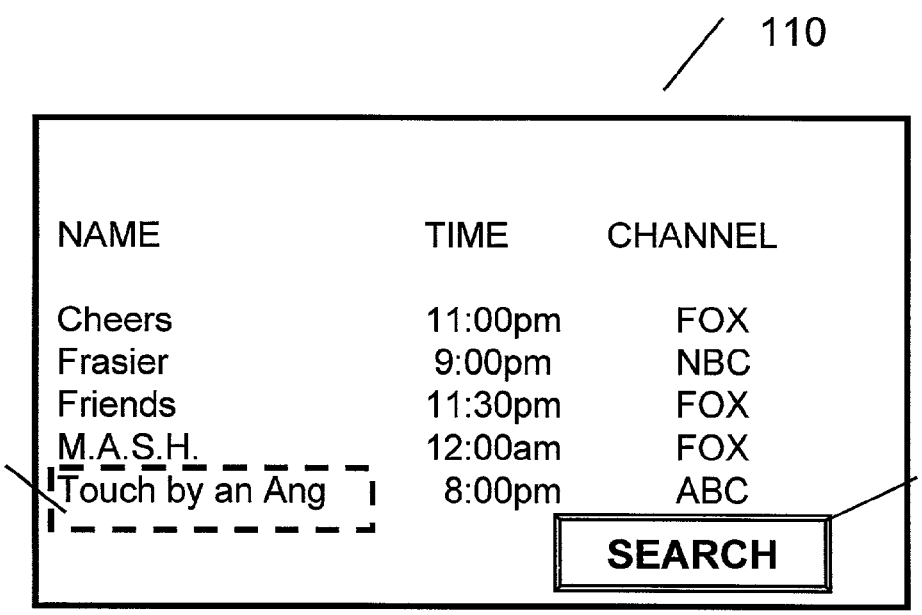
Fig. 1b - (Prior Art)

Search Results:

| NAME | TIME | CHANNEL |
|---|---|---|
| Touch by an Ang | 8:00pm | ABC |
| Touch by an Ang | 9:00pm | UPN |

Fig. 1c - (Prior Art)

| NAME | TIME | CHANNEL |
|---|---|---|
| Cheers | 11:00pm | FOX |
| Frasier | 9:00pm | NBC |
| Friends | 11:30pm | FOX |
| M.A.S.H. | 12:00am | FOX |
| Touch by an Ang | 8:00pm | PAX |

SEARCH

Fig. 3a

SEARCH FOR:

Cheers    11:00pm    FOX

BY:
☐ Name    ☒ Actor    ☐ Genre
☐ Director    ☐ From:  To:

SEARCH

Fig. 3b

Search Results:

| | NAME | TIME | CHANNEL |
|---|---|---|---|
| 311 | Cheers | 11:00pm | FOX |
| 312 | Cheers | 8:00pm | UPN |
| 313 | Frasier | 9:00pm | NBC |
| 314 | Becker | 10:00pm | NBC |

METHOD AND APPARATUS FOR FINDING THE SAME OF SIMILAR SHOWS

BACKGROUND OF THE INVENTION

1. Field of the Invention

The present invention relates generally to electronic programming guides for television. In particular, the present invention relates to providing a method for searching for the same or a similar show using an interactive electronic program guide.

2. Description of Related Art

Electronic programming guides (EPG) are known in the art and provide television viewers with on-screen television schedule information. Widely used are the on-screen program schedules that are continuously transmitted over a dedicated viewing channel, such as those available on community antenna television (CATV), closed circuit television (CCTV), and other types of signal distribution systems (e.g. hotel television systems, pay-per-view systems, etc.). These guides display the available programs on the television screen in a continuously scrolling grid, typically with the rows representing channels and the columns representing show times.

An advantage to the dedicated channel electronic program guides is that they are centrally maintained and distributed. However, they provide little or no viewer control, and are limited in the amount of program information that can be displayed. They often require patience while waiting for the desired channel listings to scroll into view, as well as periodically returning to the dedicated channel in order to view later time slots that were not previously displayed.

More sophisticated electronic program guides that allow the viewer to interact with and control the display are also known in the art. Typically, the interactive electronic program guides display digitized program data on the television screen in a grid similar to that used in the dedicated channel guides. But instead of displaying a continuously scrolling grid transmitted over a dedicated channel by a centralized source, the digitized program data is captured from a broadcast signal or periodically downloaded into the viewer's home receiving device, such as a cable set-top box, television, or VCR, where it is stored in the receiving device's memory. The receiving device is equipped with a processor that dynamically generates a displayable electronic program guide from the program data in response to video control commands entered by the viewer, usually with a television remote control unit.

Some EPGs now available to television viewers provide an opportunity to search the program data to find additional instances of the same show. For example, if a viewer tunes into a show toward its end and wants to see when the show will air again, possibly on the same channel, the EPG may allow the viewer to list all the instances of the show with their show times and stations.

However, since the EPG can search the program data for only exactly the same show demonstrates certain limitations. First, listings of even the same show may differ slightly among different stations. For example, there may be certain differences in the name or title of the show. This is primarily because the number of characters allowed in most EPGs is very limited, thereby requiring most show titles to be abbreviated. Since different program data providers may choose different abbreviations for the same show, not all instances of the same show may be found by using the name or title of the show. Second, if a viewer tunes into the last broadcast of a particular show, a search of the program data would not help because it cannot find any future showings of that particular show.

What is needed, therefore, is a way to search for shows with increased functionality.

SUMMARY OF THE INVENTION

A method and apparatus providing for expanded search functionality in an electronic program guide (EPG) for television is described. The expanded search function finds show titles that are the same or similar to the show title of the program data currently displayed by the EPG. The expanded search function also finds shows similar to the one currently displayed by the EPG by using additional search elements based on the descriptive part of the EPG program data, such as actors, director, genre, etc., as well as search parameters based on the show time, channel, etc. Rather than only finding exact matches, the expanded search function uses fuzzy logic to find near matches and prioritizes the results according to the search elements and parameters as specified by the viewer.

BRIEF DESCRIPTION OF DRAWINGS

The present invention will be described by way of exemplary embodiments, but not limitations, illustrated in the accompanying drawings in which like references denote similar elements, and in which:

FIGS. 1a–1c illustrate a prior art electronic program guide display with a search function and search function result;

FIGS. 3a–3c illustrate a electronic program guide display with an expanded search function and search function result in accordance with one embodiment of the present invention.

DETAILED DESCRIPTION OF THE INVENTION

FIGS. 1a–1c illustrate a prior art electronic program guide display with a search function and search function result. FIG. 1a illustrates a prior art EPG display 100 that contains an example of a show listing from a selection by the viewer with a few shows appearing, such as Cheers, Frasier, Friends, M.A.S.H, and Touched by an Angel. FIG. 1b illustrates the same prior art EPG display 110 in which the viewer has marked one of the shows, in this case Touched by an Angel 111 broadcast on ABC at 8:00 pm, in preparation for actuating a search function 105 for other instances of the Touched by an Angel show. Note, however, that the show title displayed in the prior art EPG displays 100/110 has been abbreviated to "Touch by an Ang." The prior art search function 105 performs a simple and straightforward search for shows matching the abbreviated show title "Touch by an Ang" and the search results are illustrated in the EPG display 120 in FIG. 1c. As shown in FIG. 1c, besides the originally displayed instance of Touched by an Angel 111 broadcast on ABC at 8:00 pm, only one other instance of the show title "Touch by an Ang" 121 broadcast on channel UPN at 9:00 pm is found and displayed in EPG display 120.

Figure 2:
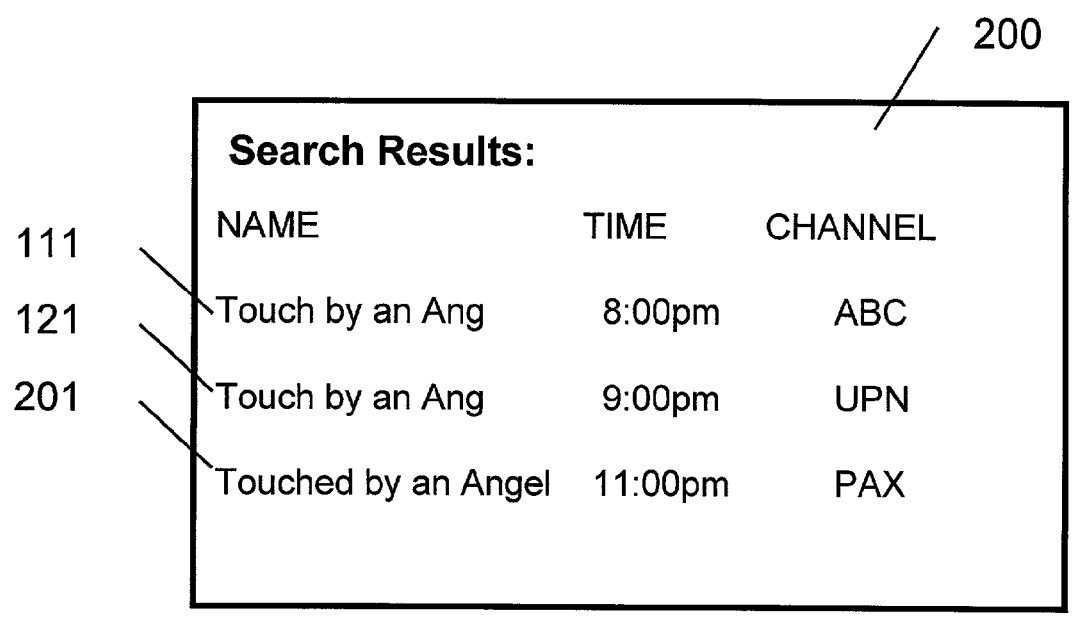
FIG. 2 illustrates an electronic program guide display with an expanded search function result in accordance with one embodiment of the present invention.

FIG. 2 illustrates an electronic program guide display 200 with an expanded search function result in accordance with one embodiment of the present invention. In the illustrated embodiment the viewer has marked one of the shows, in this case Touched by an Angel 111 broadcast on ABC at 8:00 pm, in preparation for actuating a search function for other instances of the Touched by an Angel show, the same as in the example illustrated in FIGS. 1a–1b. Instead of searching for a show with the exact same title, an embodiment of the expanded search function of the present invention searches for shows with titles that are similar to the abbreviated title "Touch by an Ang" to find not only the first instance found by the prior art search broadcast on UPN and 9:00 pm 121, but also a second instance broadcast on PAX at 11:00 pm 201. As can be seen, the show title of the second instance 201 is not abbreviated, but rather spelled out fully, which prevented the prior art search from finding the show.

FIGS. 3a–3c illustrate a EPG display with an expanded search function and search function result in accordance with one embodiment of the present invention. FIG. 3a illustrates a prior art EPG display 300 that contains an example of a show listing from a selection by the viewer with a few shows appearing, such as Cheers, Frasier, Friends, M.A.S.H, and Touched by an Angel, similar to that illustrated in FIG. 1a. FIG. 3a further illustrates the EPG display 300 in which the viewer has marked one of the shows, in this case Cheers 301 broadcast on ABC at 8:00 pm, in preparation for actuating an expanded search function 305, either through a viewer action on the display as illustrated (e.g. clicking the desired show with an input device and displaying the clicked show as highlighted in contrast to other shows) or through a viewer action on a remote control device. In one embodiment a command button or other graphical visual icon is provided for affirmatively entering a command on the EPG display to initiate the expanded search function 305 based on the marked selection of the Cheers 301 show.

With reference to FIG. 3b, upon selection by the viewer, the expanded search function 305 first moves or pastes into the EPG search display 310 the marked/selected show name Cheers 301 and its associated features, such as the name or show title 302, directors 303, actors 304, etc., as drawn from the descriptive part of the EPG program data. The associated features operate as search elements in addition to or in lieu of the show title search on the show name Cheers 301.

In one embodiment, the search screen may have additional search parameters such as genre 306, show date or time ranges 307, or other parameters that indicate further viewer preferences. Like the search elements, the additional search parameters may also be derived from the descriptive part of the EPG program data, e.g. a genre 306 of comedy or drama. The parameters may also be based on the scheduling part of the EPG program data, e.g. the show date or time ranges 307 or the show broadcast channel (not shown). When the viewer actuates the expanded search function 305, either through a viewer action on the display as illustrated or through a viewer action on a remote control device, a search is performed that has a broader scope than the prior art search 105 which only searches for additional broadcasts of exactly the same show.

In one embodiment a command button or other graphical visual icon is again provided for affirmatively entering a command to further carry out the expanded search function 305 based on the selection of the Cheers 301 show and the selected search element(s) or parameter(s). In the illustrated example in FIG. 3b, the search element actors 304 is selected, so the expanded search function 305 will search for all shows having the same actors that were listed in the descriptive program data for the selected Cheers show 301, but will not confine the search to only shows having the "Cheers" show name.

The results of the expanded search function 305 are illustrated in EPG display 320 in FIG. 3c. As shown, the results include not only the two instances of shows having the "Cheers" show name 311 and 312, but also other shows with the actors from Cheers, namely the Frasier show with actor Kelsey Grammar 313, and the Becker show with actor Ted Danson 314. Thus, the results are characterized by the search element actors 304, the values for which are derived from the selected show, in this case Cheers 301, that forms the basis of the search reference. The viewer can then select from the results which of the shows to watch, or may repeat the expanded search function 305 using the selected result as the specific show that forms the basis of the search reference.

It should be understood that the same technique may also be used with movies or any other program for which the show title and other descriptive information are available on the EPG program data. For example, if a Steve Martin festival is playing, a viewer could search for other shows in which Steve Martin appears instead of only the specific show that forms the basis of the search reference.

It should further be understood that the EPG displays 200, 300, 310, 320, as shown are for descriptive purposes only, and that other variations for accomplishing the described entry, selections or commands to the EPG displays 200, 300, 310, 320 may be employed without departing from the principles of or exceeding the scope of the present invention.

In one embodiment, the sort order of the results in EPG display 320 is determined by the selection of additional search parameters. Many different additional parameters may be set, such as the show times, the likelihood of matching content based on the search elements from the program descriptive data (i.e. the actors, directors, etc.) Rather than attempting an exact match, this type of approach uses a kind of "fuzzy logic" database search, where the probability of a match is determined according to the rules established by the search elements and parameters, and the results are presented in a list according to the probability of a near match, with the highest probability on the top and the lowest probability on the bottom.

In one embodiment, the viewer can fine tune the search, if desired, by changing some existing parameters or by editing the show name in EPG display 310. An advantage of the expanded search function 305 is that it offers a much higher level of viewer interaction with the EPG. The expanded search function 305 allows the viewer to effectively search for "replacements" of the show if the show itself is not available, or if a replacement, for example, has an earlier re-airing time than the show originally specified. In one embodiment, the exact or nearest matches may not be at the top of the list, but rather further down, depending on the search parameters specified by the viewer.

In one embodiment the search elements and parameters may be combined for a complex search that may be further adjusted by a slider or other or other graphical visual icon or input device which permits the viewer to give additional weight to certain parameters, such as the actor's name versus the director's name, or the show genre versus the actor's name. In one embodiment the use of the slider or other graphical visual icon or input device causes the input of a discrete value into the fuzzy logic of the expanded search function's search engine, so that the search is weighted in favor of one search element or parameter over another, instead of merely a simple search, as in the prior art EPGs (e.g. search by name or not name). In one embodiment, the discrete value is selected from a range of discrete values displayed as a continuum on the EPG display 310. In alternate embodiments, the discrete value may be specified using a keypad on a remote control device or some other conventional mechanism for specifying a value.

Figure 4:
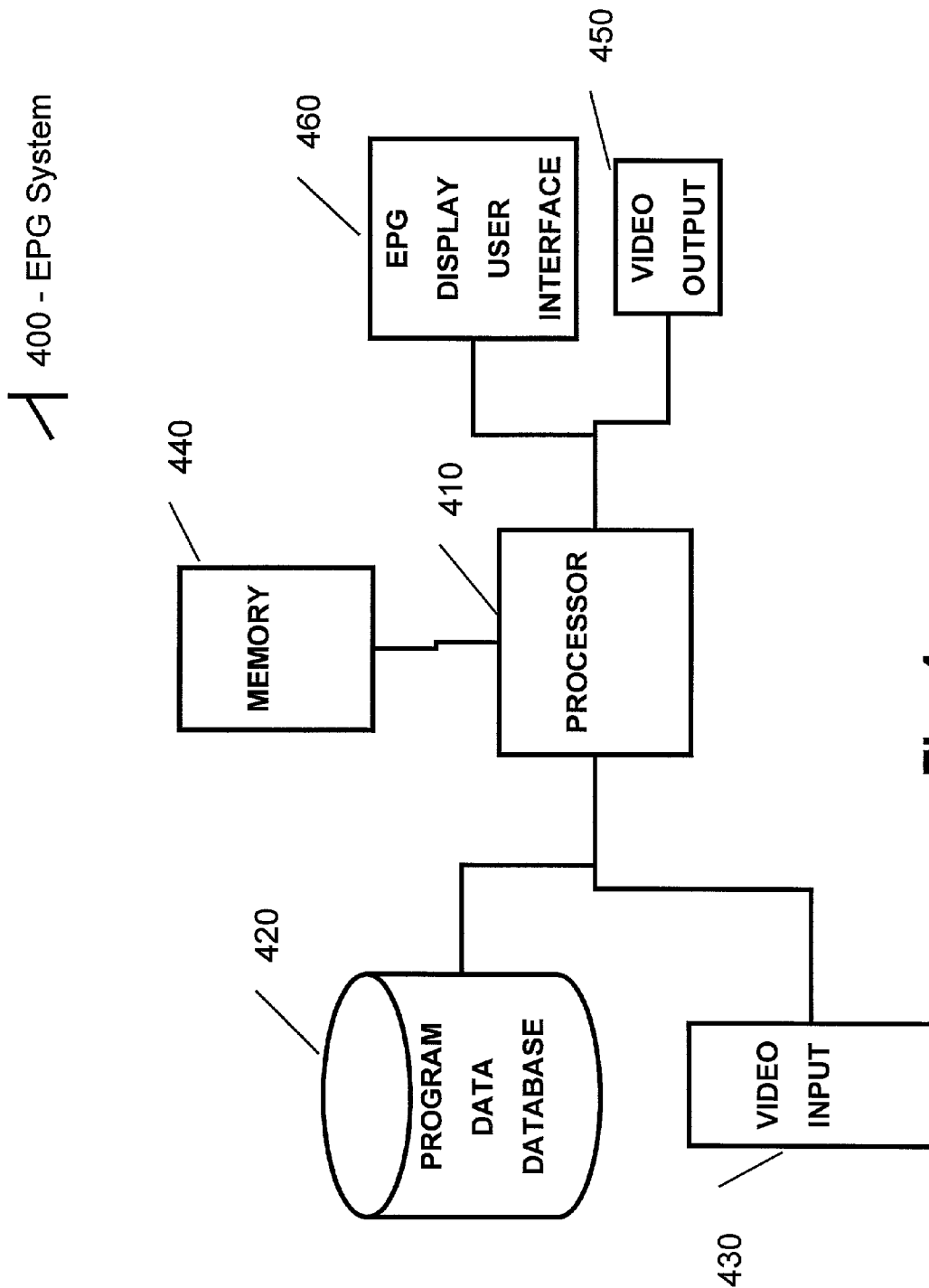
FIG. 4 is a block diagram overview of an EPG on which one embodiment of the invention may be implemented.

FIG. 4 provides a block diagram overview of an EPG system 400 on which an embodiment of the present invention may be implemented. A processor 410 is coupled in communication with an EPG program data database 420, a program logic memory 440, a video input source 430, a video output 450 and an EPG display user interface 460.

The processor 410 may be any of a plurality of commercially available processors such as the a processor from the Motorola 68000 series of processors, a processor from the Intel 8086 family of processors or a higher level processor such as a processor from the Intel Pentium™ family of processors or from the Motorola PowerPC™ family of processors. The processor 410 in the described embodiment acts under program control by a program stored in program logic memory 440 to perform the previously described expanded search functions 305.

The program data database 420 is populated with program data obtained from a commercial EPG program data source such as the TVGuide, or other providers via a machine-accessible medium, including a CD or floppy diskette, or via the Internet or any communication medium, including a satellite, conventional or cellular telephone network. The program data database 420 may reside locally with the processor 410 or remotely on a centralized server accessible via the Internet or other communication network. In one embodiment the program data database 420 may reside in program logic memory 440 or on a removable storage medium accessible by the processor 410. The EPG program data on the program data database 420 is comprised of show names or titles, and other descriptive information such as the actors, director, or genre. The EPG program data is further comprised of scheduling information such as the channels, dates, and times of broadcast. The descriptive information and scheduling information are used to provide the search elements and search parameters previously described and used by the expanded search function 305.

The EPG display user interface 460 comprises, among other displays, the previously described EPG displays 200, 310, 320, and 330 that provide for user input to the expanded search function 305 through a viewer action on the EPG displays as previously described or through a viewer action on an input control device. The program stored in program logic memory 440 performs the expanded search functions 305 in conjunction with the user input via the EPG display user interface 460 to find and display the results of the search, and in some embodiments to further control the selection of programs from the video input 430 for display on the video output 450. It should be noted that although the EPG display user interface 460 is typically implemented in an EPG system 400 that is part of a television set, video recording device, or television-enabled appliance, the EPG display user interface 460 may also be implemented separately on a browser as one or more web pages that display information from the program data database 420 and made available over the Internet without departing from the principles of the invention.

Accordingly, a novel method and apparatus is described for a electronic asset lending library method and apparatus, so as to enable the electronic management and redistribution of licenses for electronic assets installed on computers connected through a communications network.

EPILOGUE

From the foregoing description, those skilled in the art will recognize that many other variations of the present invention are possible. In particular, while the present invention has been described as being implemented on system components 410, 420, 430, 440, 450, and 460, some of the logic described in functional components of the EPG displays 200, 310, 320, and 330, and the expanded search function 305, may be distributed in other components of a EPG system 400. Thus, the present invention is not limited by the details described. Instead, the present invention can be practiced with modifications and alterations within the spirit and scope of the appended claims.

I claim:

1. A method for searching an electronic program guide comprising:
    displaying a schedule for a first program from program data;
    extracting a selected program's title from said schedule;
    displaying a plurality of first search elements derived from the description of the first program and a selected program's title;
    enabling a user to modify the selected title, the modified title being at least one of an abbreviation, a truncation and an expansion of the selected title;
    selecting at least one of the plurality of first search elements;
    enabling a user to assign discrete incremental weight to at least one of said plurality of first search elements, the discrete incremental weight being a discrete value specified via an input device;
    finding at least one of a plurality of second programs similar to the first program, the found program having at least one of a plurality of second search elements derived from the description of the second program that matches the selected search element; and
    displaying the found programs most similar to the first program before the found programs least similar to the first program, wherein the found programs most similar to the first program have the greatest number of search element matches.

2. The method of claim 1 further comprising:
    displaying a plurality of search parameters derived from the schedule of the first program;
    selecting at least one of the plurality of search parameters; and
    displaying the found programs most within the search parameters before the found programs least within the search parameters.

3. The method of claim 2 further wherein the found programs most similar to the first program have the greatest number of search element matches having the greatest weight.

4. The method of claim 2 further comprising:
    specifying a parameter weight associated with a selected search parameter, wherein the found programs most within the search parameters are the found programs most within the search parameters having the greatest weight.

5. The method of claim 4, wherein the parameter weight is a second discrete value specified via an input device.

6. The method of claim 5, wherein the second discrete value is selected from a second range of values displayed as a continuum.

7. The method of claim 6, wherein the second range of values displayed as a continuum is a slider graphic.

8. The method of claim 5, wherein the second discrete value is selected using a keypad.

9. The method of claim 5, wherein the second discrete value is selected using a slider mechanism on a remote control device.

10. The method of claim 2, wherein the plurality of search parameters is selected from the group consisting of a show time and a channel.

11. The method of claim 1, wherein the discrete value is selected from a range of values displayed as a continuum.

12. The method of claim 11, wherein the range of values displayed as a continuum is a slider graphic.

13. The method of claim 1, wherein the plurality of first search elements is selected from the group consisting of a program title, an actor, a director, and a genre.

14. An apparatus for searching an electronic program guide comprising:
- a first display of a schedule for a first program from a program data;
- a second display, associated with the first display, of a plurality of first search elements derived from the description of the first program and a selected program's title;
- enabling a user to modify the selected title, the modified title being at least one of an abbreviation, a truncation and an expansion of the selected title;
- a device, coupled to the second display, to select at least one of the displayed first search elements, to allow a user to modify the selected title and to assign a discrete incremental weight to at least one of said plurality of first search elements, the discrete incremental weight being a discrete value specified via an input-device;
- a search logic, coupled to the selector, to find at least one of a plurality of programs similar to the first program, the found program having at least one of a plurality of second search elements derived from the description of the second program that matched the selected first search element; and
- a results display, associated with the second display, of the found programs most similar to the first program before the found programs least similar to the first program, wherein the found programs most similar to the first program have the greatest number of search element matches.

15. The apparatus of claim 14 further comprising:
- the second display further comprising of a plurality of search parameters derived from the schedule of the first program;
- a second selector, coupled to the second display, to select at least one of the plurality of search parameters; and
- the results display, further comprising the found programs most within the search parameters before the found programs least within the search parameters.

16. The apparatus of claim 15 wherein the found program most similar to the first program have the greatest number of search element matches having the greatest weight.

17. The apparatus of claim 15 further comprising:
- a parameter weight associated with a selected search parameter, wherein the found programs most within the search parameters are the found programs most within the search parameters having the greatest weight.

18. The apparatus of claim 17, wherein the parameter weight is a second discrete value specified via an input device.

19. The apparatus of claim 18, wherein the second discrete value is selected from a second range of values displayed as a continuum.

20. The apparatus of claim 19, wherein the second range of values displayed as a continuum is a slider graphic.

21. The apparatus of claim 18, wherein the second discrete value is selected using a keypad.

22. The apparatus of claim 18, wherein the second discrete value is selected using a slider mechanism on a remote control device.

23. The apparatus of claim 15, wherein the plurality of search parameters is selected from the group consisting of a show time and a channel.

24. The apparatus of claim 14, wherein the discrete value is selected from a range of values displayed as a continuum.

25. The apparatus of claim 24, wherein the range of values displayed as a continuum is a slider graphic.

26. The apparatus of claim 14, wherein the plurality of first search elements is selected from the group consisting of a program title, an actor, a director, and a genre.

27. An apparatus comprising:
- a machine-accessible medium including instructions that, when executed by a machine, cause the machine to perform:
- displaying a schedule for a first program from program data;
- extracting a selected program's title from said schedule;
- displaying a plurality of first search elements derived from the description of the first program and a selected program's title;
- enabling a user to modify the selected title, the modified title being at least one of an abbreviation, a truncation and an expansion of the selected title;
- selecting at least one of the plurality of first search elements;
- enabling a user to assign discrete incremental weight to at least one of said plurality of first search elements, the discrete incremental weight being a discrete value specified via an input device;
- finding at least one of a plurality of programs similar to the first program, the found program having at least one of a plurality of second search elements derived from the description of the second program that matches the selected first search element; and
- displaying the found programs most similar to the first program before the found programs least similar to the first program, wherein the found programs most similar to the first program have the greatest number of search element matches.

28. The apparatus of claim 27, wherein the instructions cause the machine to further perform:
- displaying a plurality of search parameters derived from the schedule of the first program;
- selecting at least one of the plurality of search parameters; and
- displaying the found programs most within the search parameters before the found programs least within the search parameters.

29. The apparatus of claim 28, wherein the found programs most similar to the first program have the greatest number of search element matches having the greatest weight.

30. The apparatus of claim 28, wherein the instructions cause the machine to further perform:
- specifying a parameter weight associated with a selected search parameter, wherein the found programs most within the search parameters are the found programs most within the search parameters having the greatest weight.

31. The apparatus of claim 30, wherein the parameter weight is a second discrete value specified via an input device.

32. The apparatus of claim 31, wherein the second discrete value is selected from a second range of values displayed as a continuum.

33. The apparatus of claim 32, wherein the second range of values displayed as a continuum is a slider graphic.

34. The apparatus of claim 31, wherein the second discrete value is selected using a keypad.

35. The apparatus of claim 31, wherein the second discrete value is selected using a slider mechanism on a remote control device.

36. The apparatus of claim 28, wherein the plurality of search parameters is selected from the group consisting of a show time and a channel.

37. The apparatus of claim 27, wherein the discrete value is selected from a range of values displayed as a continuum.

38. The apparatus of claim 37, wherein the range of values displayed as a continuum is a slider graphic.

39. The apparatus of claim 37, wherein the discrete value is selected using a keypad.

40. The apparatus of claim 37, wherein the discrete value is selected using a slider mechanism on a remote control device.

41. The apparatus of claim 27, wherein the plurality of first search elements is selected from the group consisting of a program title, an actor, a director, and a genre.

* * * * *